(12) United States Patent
Miyazaki et al.

(10) Patent No.: US 7,164,441 B1
(45) Date of Patent: Jan. 16, 2007

(54) VIDEO IMAGE PRODUCING METHOD AND APPARATUS

(75) Inventors: Takao Miyazaki, Asaka (JP); Tomoyoshi Nishimura, Asaka (JP)

(73) Assignee: Fuji Photo Film Co., Ltd., Ashigara (JP)

(*) Notice: Subject to any disclaimer, the term of this patent is extended or adjusted under 35 U.S.C. 154(b) by 752 days.

(21) Appl. No.: 09/662,630

(22) Filed: Sep. 15, 2000

(30) Foreign Application Priority Data

Sep. 17, 1999 (JP) ................................. 11-263326

(51) Int. Cl.
- *H04N 5/262* (2006.01)
- *H04N 5/64* (2006.01)
- *H04N 9/31* (2006.01)
- *H04N 5/232* (2006.01)
- *H04N 9/74* (2006.01)
- *A63G 31/16* (2006.01)
- *A63J 5/02* (2006.01)
- *G03B 15/00* (2006.01)

(52) U.S. Cl. ................. 348/239; 348/744; 348/211.11; 348/586; 348/722; 472/59; 396/5

(58) Field of Classification Search ........ 348/584–589, 348/598, 722, 744, 121, 239, 211.1; 353/28–30, 353/46, 48; 434/308, 314; 472/60, 61, 59; 345/55, 32; 396/5
See application file for complete search history.

(56) References Cited

U.S. PATENT DOCUMENTS

| | | | | |
|---|---|---|---|---|
| 3,711,812 A | * | 1/1973 | Cherry | 338/200 |
| 5,061,061 A | * | 10/1991 | Robley et al. | 352/89 |
| 5,225,804 A | * | 7/1993 | Silbelus | 338/153 |
| 5,986,718 A | * | 11/1999 | Barwacz et al. | 348/592 |
| 6,022,124 A | * | 2/2000 | Bourn et al. | 362/247 |
| 6,142,913 A | * | 11/2000 | Ewert | 482/8 |
| 6,179,426 B1 | * | 1/2001 | Rodriguez et al. | 353/69 |
| 6,469,683 B1 | * | 10/2002 | Suyama et al. | 345/32 |
| 6,535,241 B1 | * | 3/2003 | McDowall et al. | 348/51 |
| 6,624,853 B1 | * | 9/2003 | Latypov | 348/722 |
| 6,766,036 B1 | * | 7/2004 | Pryor | 382/103 |
| 6,836,286 B1 | * | 12/2004 | Tachi et al. | 348/36 |
| 2004/0201764 A1 | * | 10/2004 | Honda et al. | 348/333.01 |

FOREIGN PATENT DOCUMENTS

| | | |
|---|---|---|
| JP | 08079792 | 3/1996 |
| JP | 9-220308 A | 8/1997 |
| JP | 10-327431 A | 12/1998 |
| JP | 2003-503016 A | 1/2003 |
| WO | WO-00/73334 A2 | 12/2000 |

* cited by examiner

*Primary Examiner*—David Ometz
*Assistant Examiner*—Kelly Jerabek
(74) *Attorney, Agent, or Firm*—Birch, Stewart, Kolasch & Birch, LLP (57) ABSTRACT

Projectors display a movie of a tourist resort, which is a background image, on screens, and video cameras take video by overlapping a subject walking on a treadmill with the background image. Therefore, the subject can be naturally combined in the background image, and also can enjoy a virtual experience such as strolling at the tourist resort during the video taking.

18 Claims, 13 Drawing Sheets

VIDEO IMAGE PRODUCING METHOD AND APPARATUS

BACKGROUND OF THE INVENTION

1. Field of the Invention

The present invention relates to a video image producing method and apparatus, particularly to a video image producing method and apparatus for taking a video by overlapping a subject with a background image.

2. Description of Related Art

Japanese Patent Provisional Publication No. 8-79792 discloses a conventional chroma key system. A subject is taken by a video camera with a background in a particular color such as blue. A key signal is produced by extracting the particular color from the taken image. The image of the subject and a background image that is suitably selected among a plurality of prepared background images are combined by the chroma key combination with the key signal, then the combined image is recorded in a video tape.

However, the chroma key combination is troublesome in that it causes a jitter at the boundary between the subject image and the background image, and the combination appears to be artificial because the particular color composition for obtaining the key signal overlaps with the background image sometimes. Moreover, the subject cannot perceive the video taking like a real experience, and gets bored during the taking.

SUMMARY OF THE INVENTION

The present invention has been developed in view of the above-described disadvantages, and has as its object the provision of the video image producing method and apparatus by which the subject image can be naturally combined in the background image and at the same time the subject can perceive the video taking as if it is a real experience.

In order to achieve the above-described objects, the present invention is directed to a video image producing method, comprising the steps of: displaying a movie as a background image on a screen; and taking video by overlapping a subject with the background image. Thereby, the subject can be naturally combined with the background image, and the subject can perceive the video taking like a real experience while looking at the background image during the taking.

Preferably, a treadmill is provided to a floor on which the subject stands; and speed of the treadmill and moving speed of the background image are controlled in order to be synchronized. Thereby again, the subject can have a virtual experience such as strolling at a tourist resort, while obtaining the combined image.

Preferably, the speed of the treadmill and the speed of the background image are changed by the subject with a remote control operation. Thus, the subject can walk at a desired speed and can stop, so an even more naturally-looking combined image can be obtained.

Preferably, at least one of color temperature and brightness of an illumination light illuminating the subject is changed in accordance with the background image. In other words, the color temperature and/or brightness of the subject can be adjusted with the color temperature and/or brightness of the background image, thereby a naturally-looking image combination is possible.

Preferably, sound is reproduced so as to record the sound with the video taking.

In order to achieve the above-described objects, the present invention is directed to a video image producing method, comprising the steps of: displaying an image corresponding with a desired tune on a screen as a background image while reproducing auto-accompaniment representing the tune; and taking video by overlapping a player with the background image while recording the auto-accompaniment and sound of the player. Thereby, the subject can have a virtual experience such as playing with accompaniment of the orchestra, and the experience can be taken in video and its sound can be recorded.

Preferably, if the tempo of the auto-accompaniment is changed, the background image is reproduced corresponding with tempo of the auto-accompaniment.

In order to achieve the above-described objects, the present invention is directed to a video image producing apparatus, comprising: a video taking box which accommodates a subject; a projector which displays an image on a screen being a wall of the video taking box; an image storing device which stores a sequence of background images; a projector control device which reads out the background images from the image storing device and outputs the background image to the projector; and a video camera which is provided at a position to face at the screen, wherein the video image producing apparatus takes video by overlapping the subject with the background image.

Preferably, the video image producing apparatus further comprises: a speaker which is provided within the video taking box; an audio storing device which stores audio data; an audio reproducing device which reproduces sound by reading out the audio data from the audio storing device and outputs audio data to the speaker; and a recording device with a microphone which records sound in the video taking box.

Preferably, the video image producing apparatus further comprises: a treadmill which is provided to a floor of the video taking box; and a control device which controls speed of the treadmill and moving speed of the background image such that the speeds are synchronized.

Preferably, the video image producing apparatus further comprises: a remote control which controls at least the speed of the treadmill; a receiver which receives a remote control signal from the remote control; and a control device which controls the speed of the treadmill in accordance with the remote control signal received by the receiver, controls the reading out of the background image from the image storing device and synchronizes the speed of the treadmill and the moving speed of the background image.

Preferably, the video image producing apparatus further comprises: an illumination device which changes at least one of color temperature and brightness of an illumination light illuminating the subject; and an adjusting device which adjusts the at least one of the color temperature and brightness of the illumination device in accordance with the at least one of the color temperature and brightness of the background image.

Preferably, the video image producing apparatus further comprises: a ring light which encloses the video camera as the illumination device for illuminating the subject.

Preferably, the entire wall of the video taking box is the screen, and a plurality of pairs of video cameras and illumination devices are built in the screen.

Preferably, the video image producing apparatus further comprises: a switch device which selectively switches one pair of the plurality of pairs of video cameras and illumination devices to be operable.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

Hereunder a preferred embodiment of a video image producing method and apparatus will be described with reference to the accompanying drawings.

Figure 1:
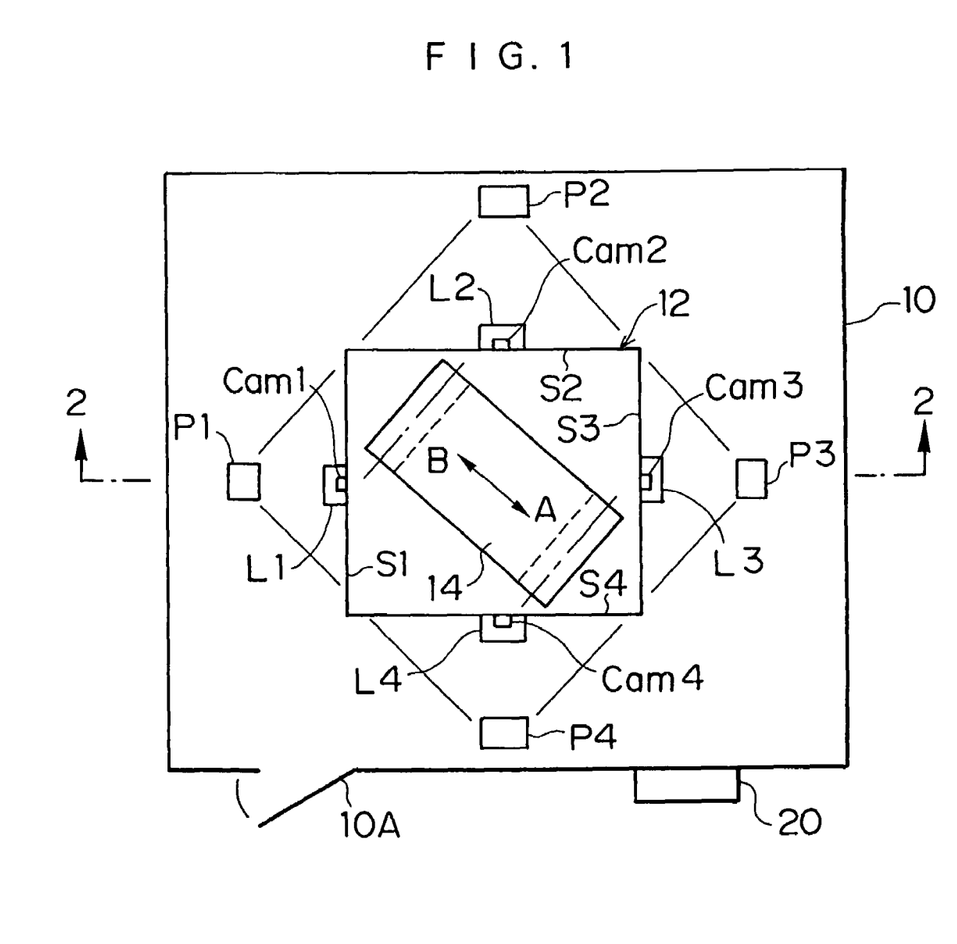
FIG. 1 is a plan view showing a schematic appearance of a video image producing apparatus of the present invention.
Figure 2:
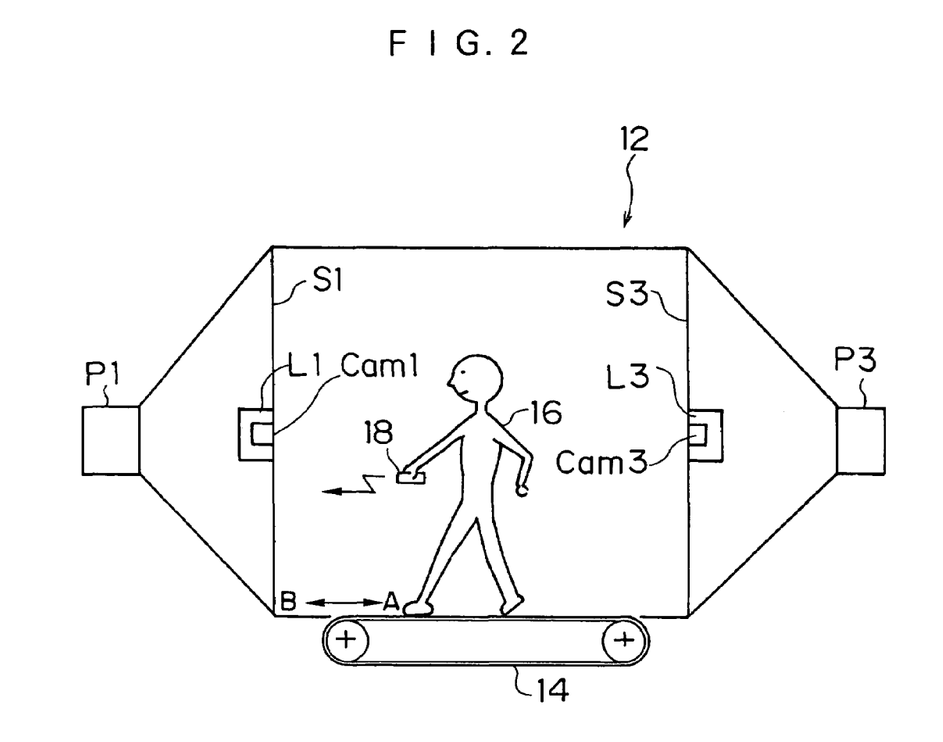
FIG. 2 is a section view along the line 2—2 in FIG. 1.

FIG. 1 is a plan view showing a schematic appearance of the video image producing apparatus according to an embodiment of the present invention. FIG. 2 is a section view along the line 2—2 in FIG. 1.

As shown in FIGS. 1 and 2, the video image producing apparatus has a video taking box 12, which is provided in a studio 10 with an entrance 10A, and screens S1–S4 are provided on the four walls of the video taking box 12. Video cameras Cam 1–Cam 4 with illumination lights L1–L4 are built in the screens S1–S4, respectively. The illumination lights L1–L4 are preferable to be ring lights in order to avoid the subject's shadow from being taken. Projectors P1–P4 are disposed for projecting a background image on the screens S1–S4 to a subject, respectively. The video cameras Cam 1–Cam 4 are provided with microphones M1–M4 (see FIG. 4) and remote-control light receivers R1–R4 (see FIG. 4), respectively.

A treadmill 14 is disposed on the floor of the video taking box 12, and the subject 16 can walk or run in place on a continuous moving belt of the treadmill 14. The treadmill 14 is driven in the direction of an arrow A or an arrow B with operation of a remote control 18 by the subject 16 as shown in FIG. 2, and the moving speed of the treadmill 14 can be changed. Detailed description on the control of the treadmill 14 by the remote control and other controls will be described later.

Figure 3:
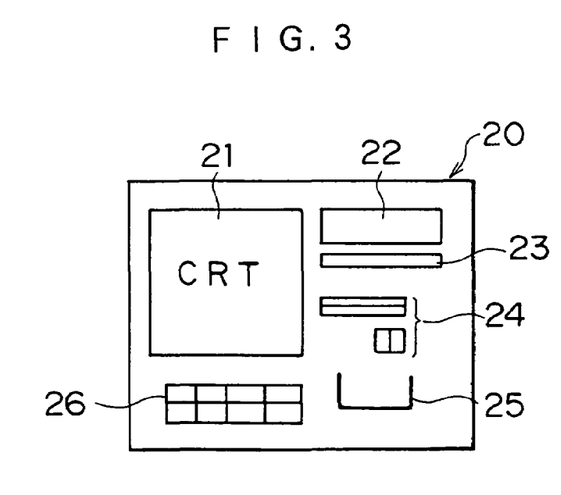
FIG. 3 is a front view of an operation panel.

An operation panel 20 is provided at the front of the studio 10. As shown in FIG. 3, the operation panel 20 is provided with a CRT display 21, an opening 22 for inserting and ejecting a record medium (e.g., a videocassette) for recording the video image, a print ejecting opening 23, an opening 24 for receiving paper money and coins, a tray 25 for giving change, and an operation part 26 including types of buttons, and so forth.

Figure 4:
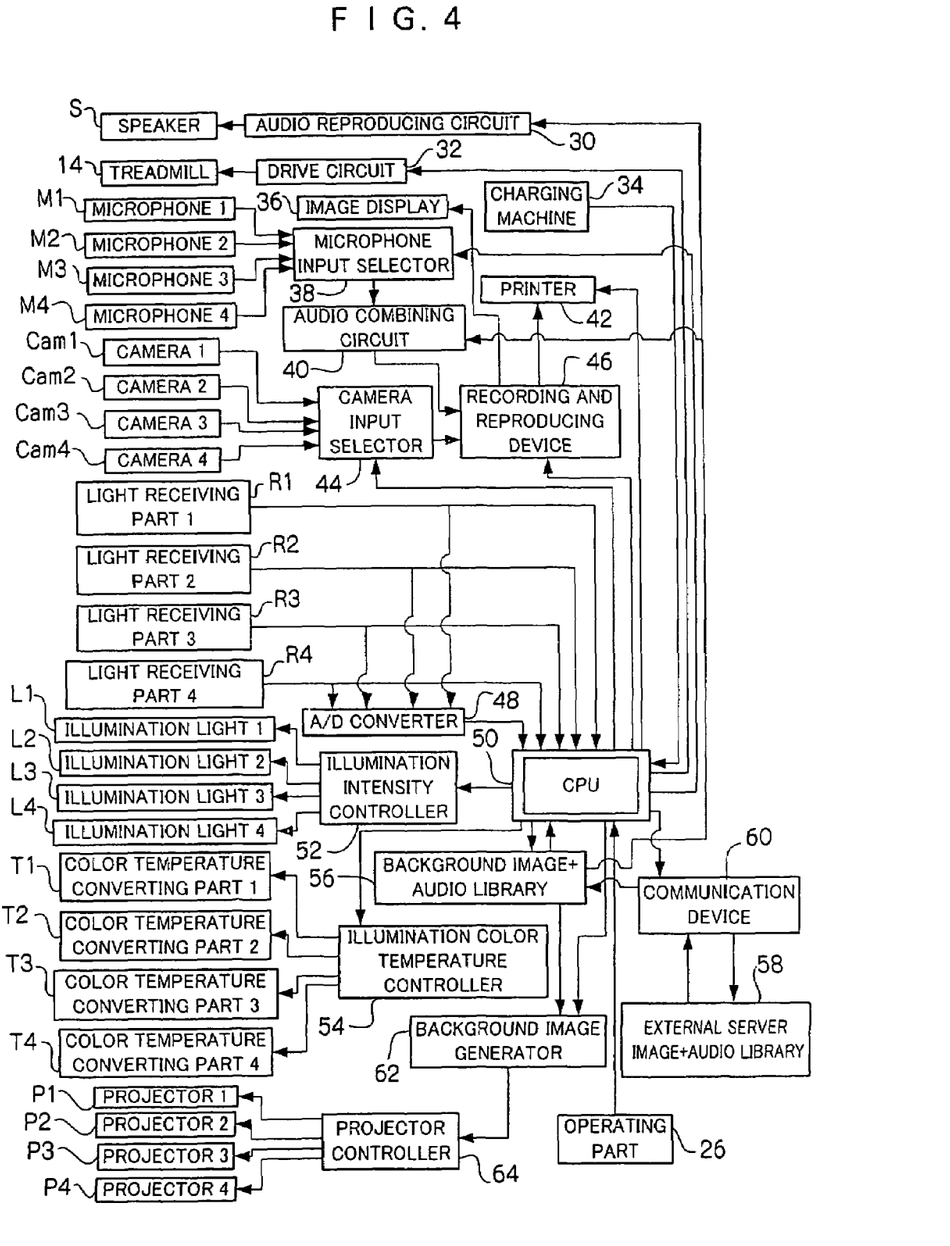
FIG. 4 is a block diagram showing an embodiment of the video image producing apparatus of the present invention.

FIG. 4 is a block diagram showing an embodiment of the video image producing apparatus according to an embodiment of the present invention.

The video image producing apparatus comprises the video cameras Cam 1–Cam 4 with the illumination lights L1–L4, the projectors P1–P4, the microphones M1–M4 and the remote-control light receivers R1–R4, which are provided to the cameras Cam 1–Cam 4, respectively, the treadmill 14, color temperature converting parts T1–T4, an audio reproducing circuit 30, a recording and reproducing device 46, a central processing unit (CPU) 50, a light intensity controller 52, an illumination color temperature controller 54, a background image and audio library 56, a background image generator 62, a projector controller 64, and so forth.

Figure 5:
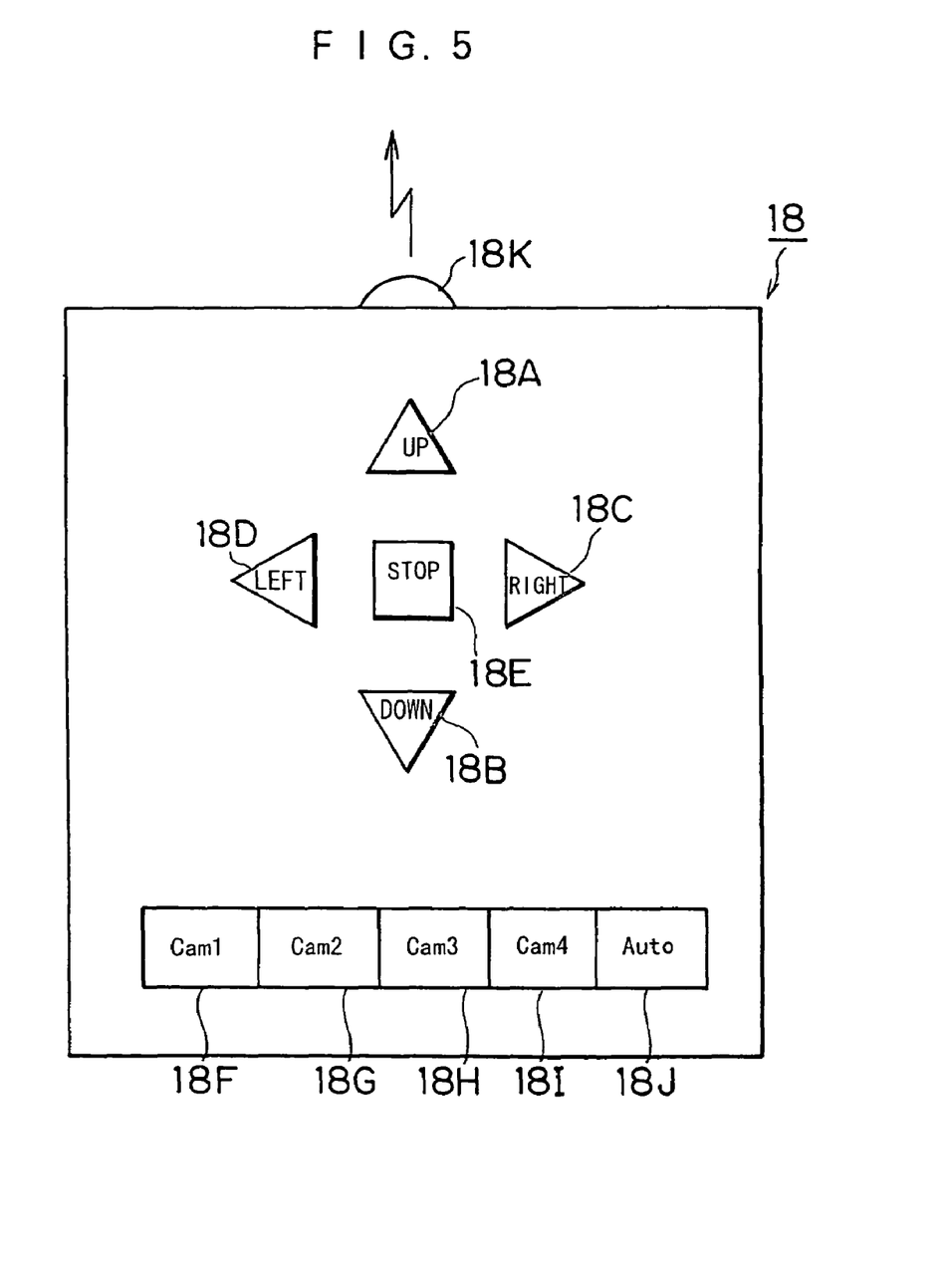
FIG. 5 is a plan view of a remote control.

FIG. 5 is a plan view of the remote control 18 for controlling the treadmill 14 and so forth.

The remote control 18 has an up-switch 18A and a down-switch 18B for bringing up/down the speed of the treadmill 14 and so forth, a right turn switch 18C, a left turn switch 18D, a stop switch 18E, manual switches 18F–18I for manually selecting the video cameras Cam 1–Cam 4, an automatic switch 18J for automatically switching the video cameras Cam 1–Cam 4, a remote-control light emitting part 18K for outputting infrared light as a carrier wave to transmit a remote-control signal in response to the switch operation. The remote-control light outputted from the remote-control light emitting part 18K is received by one or some of the remote-control light receivers R1–R4, which are provided to the video cameras Cam 1–Cam 4, respectively.

Figure 6:
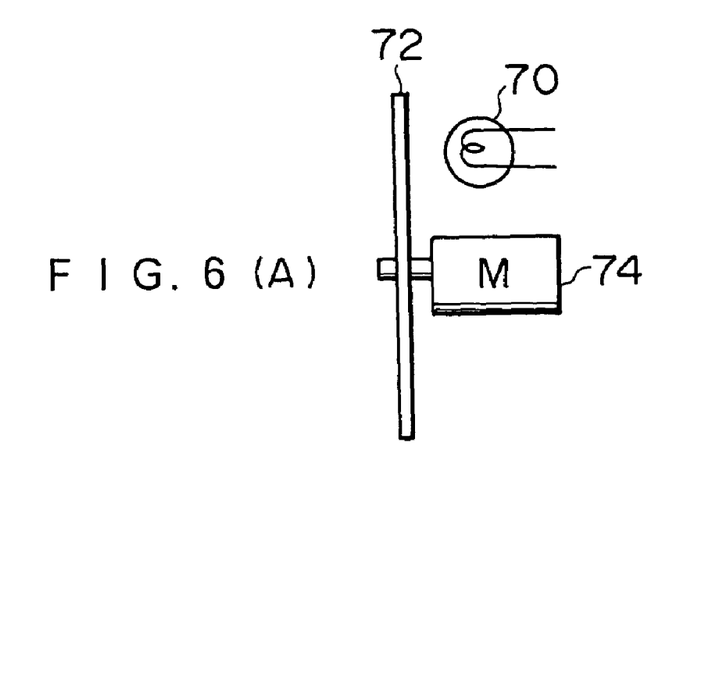
FIGS. 6(A) and 6(B) are a side view and a front view of a color temperature conversion part.

The color temperature conversion parts T1–T4 convert color temperatures of the illumination light that illuminates the subject. As shown in FIG. 6 (A), each of the color temperature conversion parts T1–T4 comprises a light source 70, a glass filter 72 arranged in front of the light source 70, and a motor 74 to turn the glass filter 74 at a suitable position. The glass filter 72 is colored in gradation from red to blue in a circumferential direction as shown in FIG. 6(B).

Returning to FIG. 4, the CPU 50 supervises the entire apparatus. The CPU 50 receives data indicating an amount of deposited money from a charging machine 34. The CPU 50 receives, from each of the remote-control light receiving parts R1–R4, an intensity signal indicating the intensity of the remote-control light received by the each of the remote-control light receiving parts R1–R4, and also receives, through an A/D converter 48, the remote-control signal transmitted by the remote-control light. The CPU 50 receives an instruction signal such as a select signal of the background image and a print request signal from the operating part 26.

Operations of the CPU 50 and the parts shown in FIGS. 1–4 will be described referring to the flowcharts in FIGS. 7–11.

Figure 7:
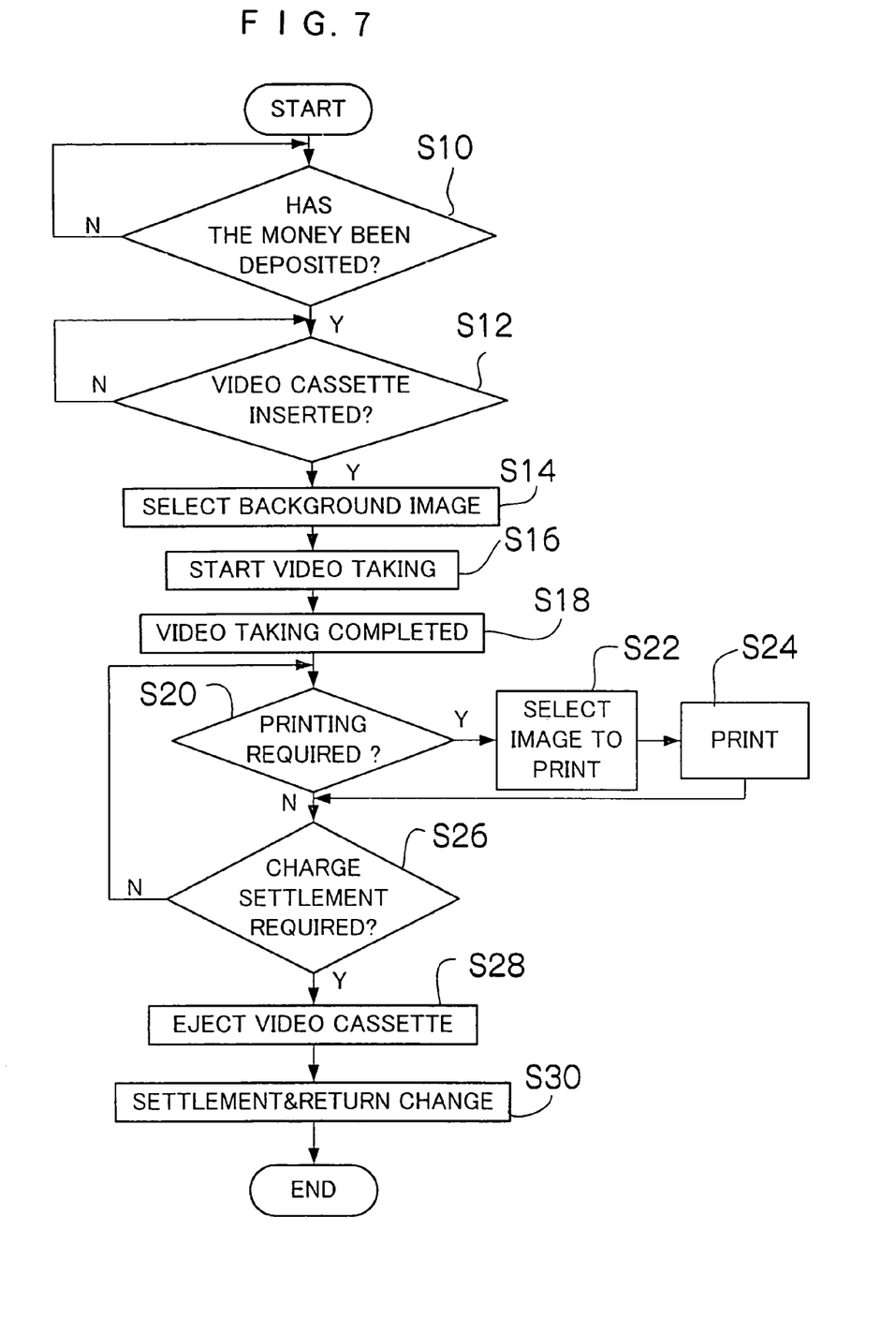
FIG. 7 is a flowchart showing the overall process of producing a video image of the present invention.

FIG. 7 is a flowchart showing an entire process from receiving money from the subject to giving the subject a videocassette in which a video image including the subject is recorded.

The CPU 50 determines whether or not the money is put by the data from the charging machine 34 (step S10). If the CPU 50 determines that the money is put, the CPU 50 then determines whether or not a videocassette is inserted in the insertion opening 22 (step S12).

As the CPU 50 determines that the videocassette is inserted, the subject selects a background image by operating with the buttons at the operating part 26 (step S14). When the background image is selected, video taking is started (step S16). In other words, when the background image is selected, the CPU 50 reads out a corresponding background image signal and an associated audio signal from the background image and audio library 56. Then, the CPU 50 outputs the read background image signal to the background image generator 62, and outputs the read audio signal to the audio reproducing circuit 30. The background image signal and the audio signal can be taken into the background image and audio library 56 from an external server 58 via a communication device 60.

The background image generator 62 outputs the background image signal, which is inputted from the background image and audio library 56, to the projectors P1–P4 through the projector controller 64 in accordance with the control signal from the CPU 50. The projectors P1–P4 project the background image on the four screens S1–S4 in accordance with the inputted background image signal, respectively.

The audio reproducing circuit 30 converts the audio signal, which is inputted from the background image and audio library 56, from a digital form to an analog form, and amplifies and outputs the analog audio signal to a speaker S; thus the sound is reproduced.

On the other hand, each of the video cameras Cam 1–Cam 4 takes a video image by overlapping the subject with the background image that is projected on the screen that is facing to the correspond camera, and outputs the video signal to a camera input selector 44. The camera input selector 44 selects one of the four video signals, which are inputted from the video cameras Cam 1–Cam 4, in accordance with the selecting instruction from the CPU 50, and outputs the selected video signal to the recording and reproducing device 46.

Each of the microphones M1–M4 picks up sound of the video taking box 12, and outputs the audio signal to a microphone input selector 38. The microphone input selector 38 selects one of the four audio signals, which are inputted from the microphones M1–M4, in accordance with the selecting instruction from the CPU 50, and outputs the selected audio signal to an audio combining circuit 40. The audio combining circuit 40 combines the audio signal that is inputted from the microphone input selector 38 and the audio signal such as background music, which is outputted from the background image and audio library 56, and outputs the combined audio signal to the recording and reproducing device 46. The recording and reproducing device 46 records the video signal and the audio signal in the videocassette.

When the video taking in a predetermined time length is completed (step S18) as described above, the CPU 50 determines whether or not printing is required (step S20). If printing is required, the CPU 50 selects an image to be printed (step S22) as follows: the video signal is reproduced from the recording and reproducing device 46 so as to display a combined image of the subject and the background image on an image display 36, and the user operates forward feeding of frames and stopping a frame. When the image to be printed is selected, the recording and reproducing device 46 outputs the video signal representing the frame image to the printing device 42 so as to let the printing device 42 print the still image (step S24).

If no printing is required or printing is completed, the CPU 50 determines whether or not charge settlement is required (step S26). If no settlement is required, the process returns to step S20; if the settlement is required, the videocassette is ejected through the ejection opening 22, and the CPU 50 settles the charge and returns the change (step S30).

Figure 8:
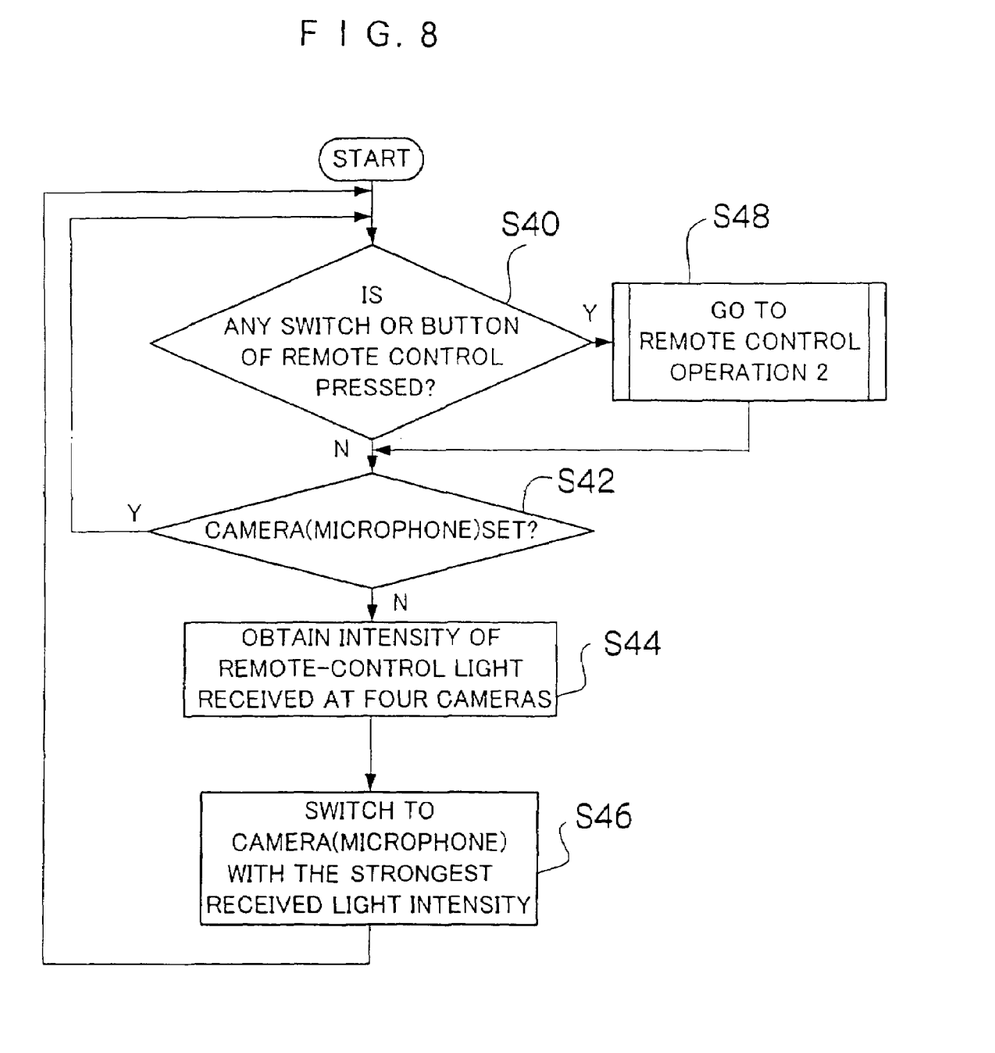
FIG. 8 is a flowchart used for depicting controls of respective parts associated with remote control.

Next, controls of the respective parts associated with the remote control operation will be described referring to flowcharts in FIGS. 8–10.

As shown in FIG. 2, the subject 16 carries the remote control 18 and stands on the treadmill 14. The subject 16 operates the remote control 18 when necessary, and the CPU 50 determines whether or not any switch or button of the remote control 18 is pressed (step S40 in FIG. 8). If no switches or buttons of the remote control 18 are pressed, the CPU 50 determines whether or not which video camera is manually selected among the video cameras Cam 1–Cam 4 with the microphones M1–M4 (in short, whether or not the video camera to be used for video taking is set) (step S42).

If the video camera is set, which means, if one of the manual switches 18F–18I (see FIG. 5) for manually selecting one of the video cameras Cam 1–Cam 4 is turned on, the CPU 50 returns to step S40 and controls the camera input selector 44 and the microphone input selector 38 in such a manner as to taking the video signal and the audio signal from the video camera and the microphone that are selected by the manual switches 18F–18I.

If the video camera is not set, which means, if the automatic switch 18J for automatically switching the video cameras Cam 1–Cam 4 is turned on, the CPU 50 obtains the signal indicating the intensity of the received remote-control light in accordance with the remote control signal inputted from the remote-control light receiving parts R1–R4 of the video cameras (step S44). The CPU 50 then switches the camera input selector 44 and the microphone input selector 38 so that the video camera and the microphone with the highest intensity of received remote-control light is selected (step S46).

Figure 9:
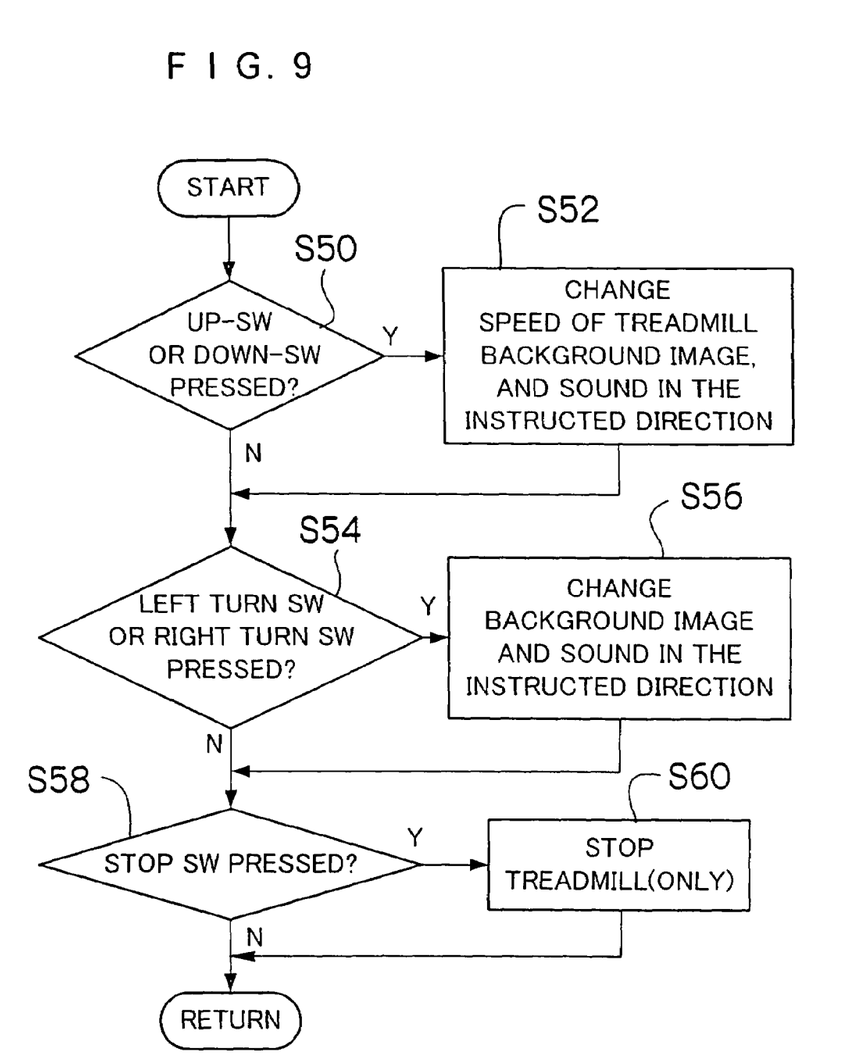
FIG. 9 is a flowchart used for depicting controls of respective parts associated with remote control.
Figure 10:
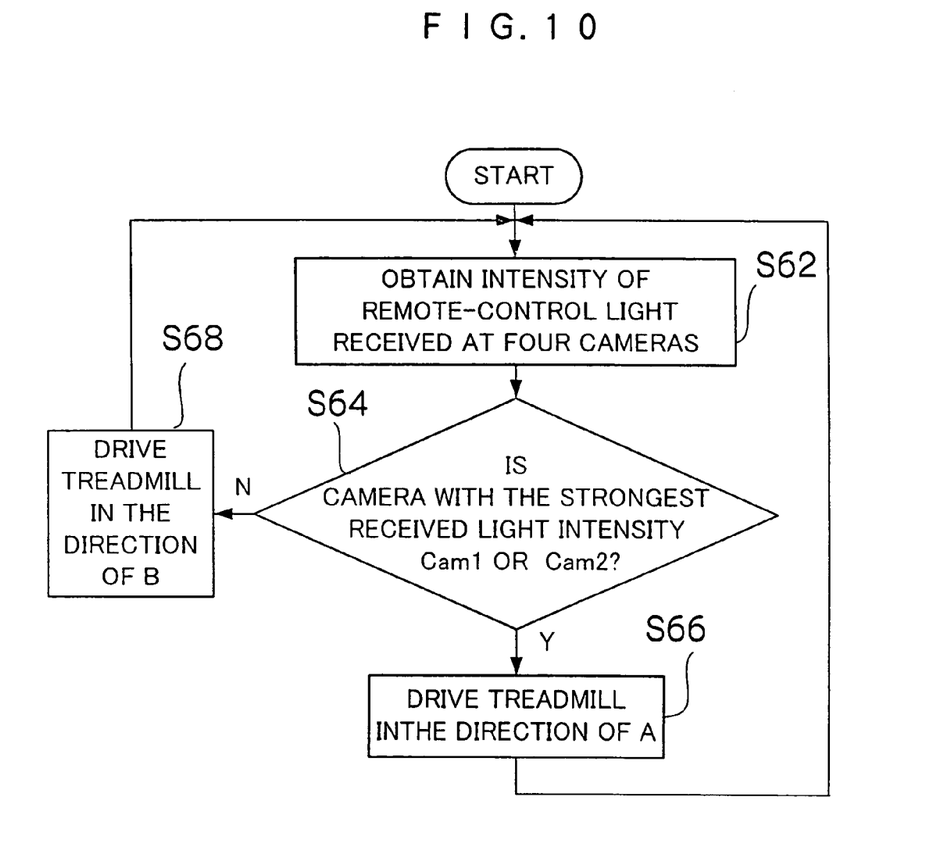
FIG. 10 is a flowchart used for depicting controls of respective parts associated with remote control.

If the CPU 50 determines that the switches or the buttons of the remote control 18 are pressed at step S40, the process goes on to a subroutine in FIG. 9 (step S48).

As shown in FIG. 9, the CPU 50 determines whether or not the up-switch 18A or the down-switch 18B of the remote control 18 for bringing up or down the speed of the treadmill 14 is pressed (step S50). If the CPU 50 determines that the up-switch 18A or the down-switch 18B is pressed, the CPU 50 outputs the control signal to the drive circuit 32 so as to bring up or down the speed of the treadmill 14, which moves in an instructed direction, and changes the speed of the treadmill 14 (step S52).

The CPU 50 brings up or down the speed of the treadmill 14 in a step-by-step manner by pressing the up-switch 18A or the down-switch 18B once. The moving direction of the treadmill 14 is determined in accordance with an thrown direction of the remote control light (the direction in which the subject is moving). In other words, as shown in FIG. 10, the intensity is obtained of the received remote-control light, which enters into the remote-control light receiving parts R1–R4 of the video cameras Cam 1–Cam 4 (step S62), and the CPU 50 determines whether or not the video camera with the highest intensity of the received remote-control light is the video camera Cam 1 or Cam 2 (step S64).

As shown in FIG. 1, if the video camera with the highest intensity is the video camera Cam 1 or Cam 2, it means that the subject is moving in the direction of the arrow B, and the treadmill 14 is then driven in the direction of the arrow A (step S66), so that the subject can stand at substantially the center of the treadmill 14 all the time (see FIG. 2). In a case where the video camera with the highest intensity is not the video camera Cam 1 or Cam 2 (i.e., the video camera with the highest intensity is the video camera Cam 3 or Cam 4), it means that the subject is moving in the direction of the arrow A; hence the treadmill 14 is driven to move in the direction of the arrow B (step S68).

At step S52 in FIG. 9, the CPU 50 controls the treadmill 14, and at the same time controls the moving direction, speed, and sound of the background image correspondingly with the moving direction and moving speed of the treadmill 14.

The CPU 50 determines at step S54 whether or not the right-turn switch 18C or the left-turn switch 18D of the remote control 18 is pressed. If the CPU 50 determines that the right-turn switch 18C or the left-turn switch 18D is pressed, it changes the background image and sound in the instructed direction (step S56). The subject is taken by the video as if he/she turned right or left by the changing of the direction of the background image.

The CPU 50 determines at step S58 whether or not the stop switch 18E of the remote control 18 is pressed. If the CPU 50 determines that the stop switch 18E is pressed, it stops the treadmill 14 (step S60).

Figure 11:
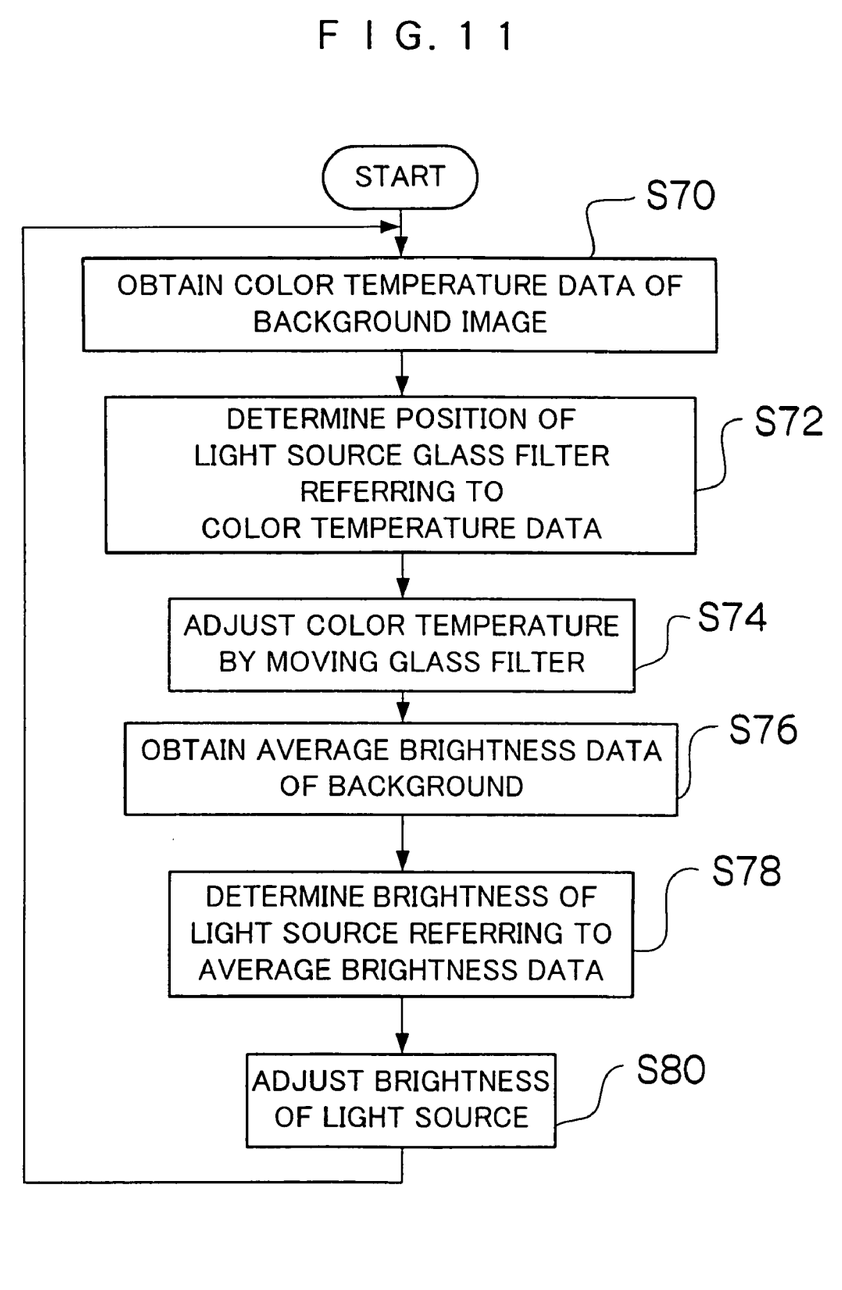
FIG. 11 is a flowchart used for depicting the control over illumination intensity and color temperature.

Now, controls over the intensity of illumination and color temperature will be described referring to a flowchart in FIG. 11.

First, the CPU 50 obtains color temperature data of the selected background image, and outputs the obtained color temperature data to the illumination color temperature controller 54 (step S70). The illumination color temperature controller 54 determines a rotation position of the glass filter 72 (see FIGS. 6(A) and 6(B)) according to the obtained color temperature data (step S72), and controls the motor 74 so that the glass filter 72 moves at the determined position (step S74). Thereby, the color temperature of the illumination light, which illuminates the subject, is adjusted to correspond with the color temperature of the background image.

Moreover, the CPU 50 also obtains average brightness data of the selected background image, and outputs the obtained average brightness data to the illumination intensity controller 52 (step S76). The illumination intensity controller 52 determines the brightness of the illumination light by referring to the received average brightness data (step S78), and adjusts the brightness of the illumination light to be the determined brightness (step S80).

Figure 12:
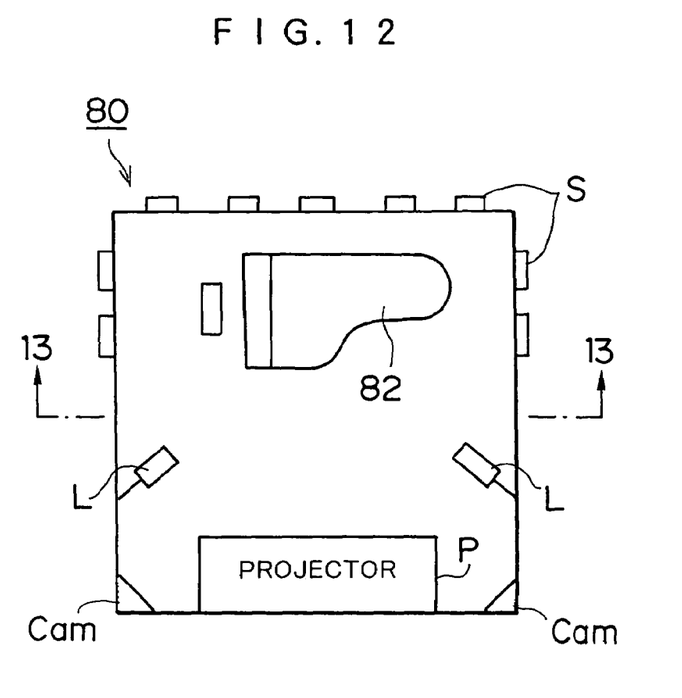
FIG. 12 is a plan view showing a schematic appearance of another embodiment of the video image producing apparatus of the present invention.
Figure 13:
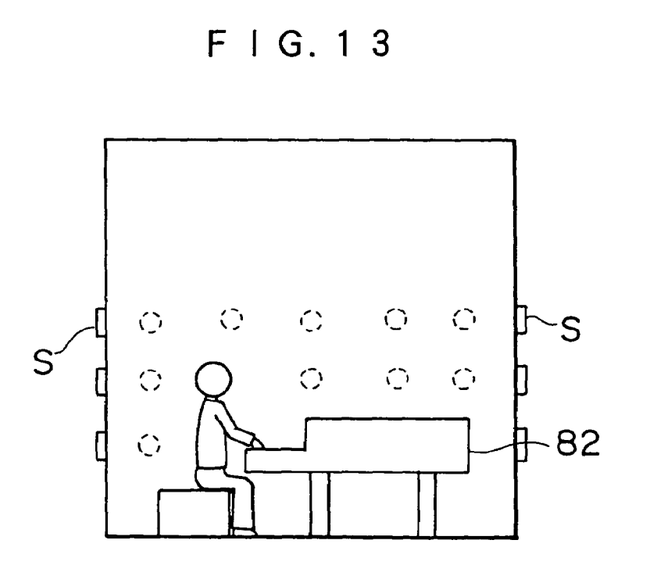
FIG. 13 is a section view along the line 13—13 in FIG. 12.

FIG. 12 is a plan view of a schematic appearance of another embodiment of the video image producing apparatus of the present invention. FIG. 13 is a section view along the line 13—13 in FIG. 12.

As shown in FIGS. 12 and 13, a plurality of small-sized speakers S are built in the walls of the studio 80 of the video image producing apparatus in a form of an array, and one projector P, which uses one wall as a screen, and one video camera Cam with two ring lights and two illumination lights L are arranged in the studio 80. In this embodiment, the piano 82 is set in the studio 80.

Figure 14:
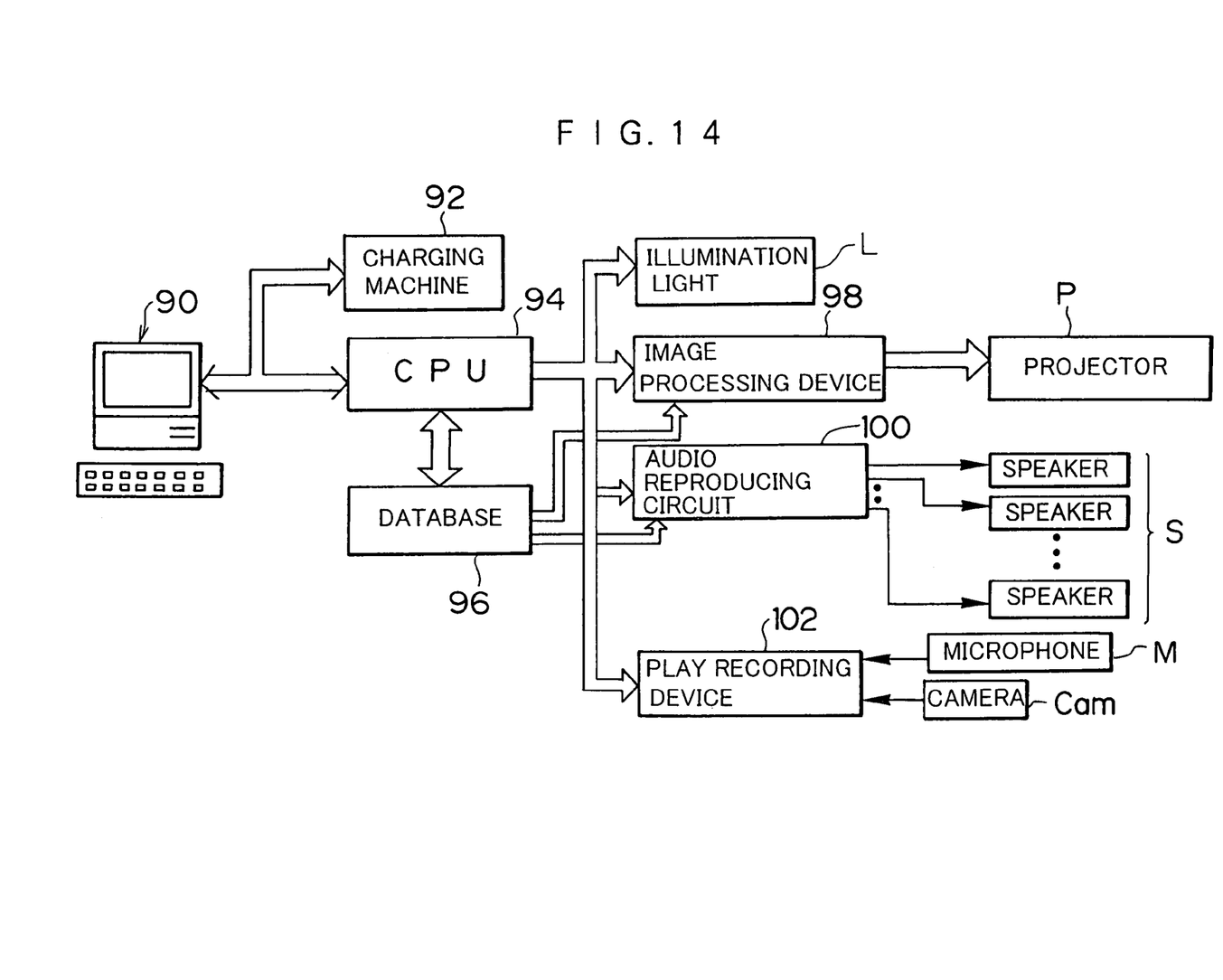
FIG. 14 is a block diagram showing an embodiment of a video image producing apparatus of the present invention.

FIG. 14 is a block diagram showing an embodiment of the video image producing apparatus of the present invention.

The video image producing apparatus comprises the video camera Cam with the ring light, the projector P, the microphone M provided to the video camera Cam, the illumination light L, the audio reproducing circuit 30, a personal computer 90 including a keyboard, which serves as a play condition input device, and a monitor, a charging machine 92, a CPU 94, a database 96, which records the background image signal indicating an image of the play and the audio signal as the auto-accompaniment of every tune, an image processing device 98, an audio reproducing circuit 100, and a play recording device 102.

Figure 15:
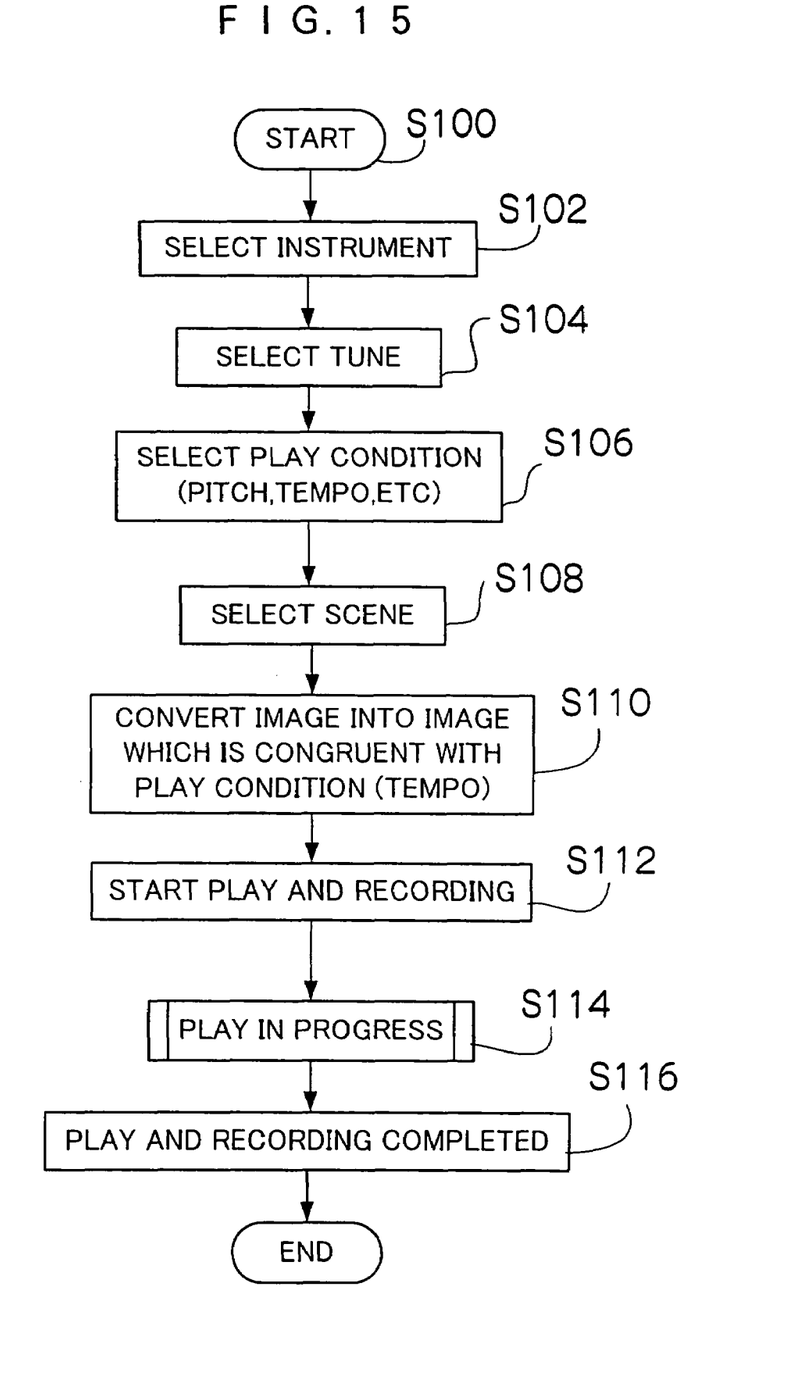
FIG. 15 is a flowchart showing a process for video taking by overlapping a subject (player) with a background image while recording auto-accompaniment and music of the player.

FIG. 15 is a flowchart showing a process for taking video by overlapping the subject (player) with the background image and for recording the auto-accompaniment and the playing sounds of the player.

When the player puts a predetermined amount of money in a charging machine 92, a process shown in FIG. 15 is started (step S100), and the player first selects an instrument and a tune to play (steps S102 and S104). The player then selects the playing condition such as pitch and tempo of the selected tune (step S106).

Next, the player selects a scene as the background image (step S108). More specifically, there are views from audience sheets to the stage and from the stage to the sheets and so forth, and the player selects a desired scene among the scenes. The selecting operations through steps S102–S108 are performed using the keyboard and the mouse of the personal computer 90.

The CPU 94 reads out the background image signal of the selected scene from the database 96 and outputs the selected background image signal to the image processing device 98. The image processing device 98 converts the background image signal, which is taken from the database 96, to be congruous with the playing condition (tempo), and outputs the background image signal to the projector P (step S110). This process is necessary in purpose of adjusting the movement of the background image with the tempo of the play.

The CPU 94 also reads out from the database 96 the audio signal of the respective instruments that play the selected tune (this reading, however, excludes the audio signal of the instrument that is actually played by the player), and lets the audio reproducing circuit 100 output the audio signal. The audio reproducing circuit 100 converts the audio signals of the respective instruments that are taken from the database 96 from the digital form to the analog form and amplifies the audio signals, then outputs the audio signals to the corresponding speaker S among the plural speakers S, which are arranged like an array so as to reproduce the auto-accompaniment. Thereby, for example, one speaker S generates the sound of the violin while another speaker generates the sound of the clarinet; and thus the player can perceive the virtual experience like a real one as if he/she is standing on the stage with an orchestra.

As described above, the player can play one's instrument with the auto-accompaniment. When the play is started, the video camera Cam takes a video image by overlapping the player with the background image during the play and outputs the video signal to the play recording device 102, and at the same time the microphone M picks up the auto-accompaniment and the playing sound and outputs the audio signal to the play recording device 102 (step S102). Thereby, an image in which the player is overlapped with the background image is recorded while the auto-accompaniment and the playing sounds of the player are recorded, and when the play is finished, the recording of the image and sound is completed (step S104).

As described above, according to the present invention, a moving image as a background image is displayed on the screen and the subject is videotaped by overlapping the subject with the background image. Thus the subject can naturally be combined in the background image, and further, the subject can stroll in a tourist resort, a computer graphic, and a virtual reality space during video taking, or can enjoy a virtual experience such as playing one's instrument with an orchestra.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A video image producing method, comprising the steps of:
   providing a studio with a video-taking box having four stationary walls facing one another and stationary screens on the four walls of the video-taking box;
   displaying a movie as a background image on at least one of the screens;
   taking video of a subject located in the video taking box and the background image by overlapping the subject with the background image;
   providing a treadmill in a floor on which the subject is located;
   controlling speed of the treadmill by the subject; and
   controlling moving speed of the background image in order to synchronize both of the speeds.

2. The video image producing method as defined in claim 1, wherein said speed of the treadmill and said speed of the background image are changed by the subject with a remote control operation.

3. The video image producing method as defined in claim 1, wherein at least one of color temperature and brightness of an illumination light illuminating the subject is changed in accordance with said background image.

4. The video image producing method as defined in claim 1, wherein sound is reproduced so as to record the sound with said video taking.

5. A video image producing apparatus for producing a video image of a subject, comprising:
   a video taking box having four stationary walls facing one another and stationary screens on the four walls of the video-taking box and located on a floor and which accommodates a subject;
   a projector which displays an image on a screen being a stationary wall of said video taking box;
   an image storing device which stores a sequence of background images;
   a projector control device which reads out the background images from said image storing device and outputs the background image to said projector;
   a video camera which is provided at a position to face at said screen;
   a treadmill which is provided in a floor of said video taking box for use by a moving subject; and
   a control device which controls speed of the treadmill and moving speed of said sequence of background images such that the speeds are synchronized;
   wherein said video image producing apparatus takes video of the moving subject and the sequence of background images by overlapping the moving subject with the sequence of background images.

6. The video image producing apparatus as defined in claim 5, further comprising:
   a speaker which is provided within said video taking box;
   an audio storing device which stores audio data;
   an audio reproducing device which reproduces sound by reading out the audio data from said audio storing device and outputs audio data to said speaker; and
   a recording device with a microphone which records sound in said video taking box.

7. The video image producing apparatus as defined in claim 5, further comprising:
   a remote control which controls at least said speed of the treadmill;
   a receiver which receives a remote control signal from said remote control; and
   a control device which controls the speed of said treadmill in accordance with the remote control signal received by the receiver, controls the reading out of the background image from said image storing device and synchronizes the speed of said treadmill and said moving speed of said background image.

8. The video image producing apparatus as defined in claim 5, further comprising:
   an illumination device which changes at least one of color temperature and brightness of an illumination light illuminating the subject; and
   an adjusting device which adjusts the at least one of the color temperature and brightness of said illumination device in accordance with the at least one of the color temperature and brightness of said background image.

9. The video image producing apparatus as defined in claim 5, further comprising: a ring light which encloses said video camera as the illumination device for illuminating the subject.

10. A video image producing apparatus, comprising:
    a video taking box located on a floor and which accommodates a subject;
    a projector which displays an image on a screen being a wall of said video taking box;
    an image storing device which stores a sequence of background images;
    a projector control device which reads out the background images from said image storing device and outputs the background image to said projector;
    a video camera which is provided at a position to face at said screen;
    a treadmill which is provided in a floor of said video taking box; and
    a control device which controls speed of the treadmill and moving speed of said background image such that the speeds are synchronized;
    wherein said video image producing apparatus takes video by overlapping the subject with the background image; and
    wherein the entire wall of said video taking box is the screen, and a plurality of pairs of video cameras and illumination devices are built in said screen.

11. The video image producing apparatus as defined in claim 10, further comprising: a switch device which selectively switches one pair of said plurality pairs of video cameras and illumination devices to be operable.

12. A video image producing method, comprising:
    providing a video taking enclosure having of at least three individual stationary walls which accommodate a subject;
    providing a plurality of projectors, each of which displays a sequence of images on one of a plurality of wall screens associated with each individual wall of the video taking enclosure; and providing a plurality of video cameras, each of which views a different individual wall screen of the video taking enclosure; and taking video by all of the cameras of both the subject and a background image viewed by a given camera.

13. A video image producing method, comprising:

providing a video taking enclosure having a plurality of individual walls which accommodate a subject;

providing a plurality of projectors, each of which displays a sequence of images on one of a plurality of wall screens associated with each individual wall of the video taking enclosure; and providing a plurality of video cameras, each of which views a different individual wall screen of the video taking enclosure; and wherein video may be taken by one or more of the cameras by combining the subject and the background image viewed by a given camera;

wherein the video is taken by a camera having a straight line of sight to a projector.

14. A video image producing method, comprising:

providing a video taking enclosure having a plurality of individual walls which accommodate a subject;

providing a plurality of projectors, each of which displays a sequence of images on one of a plurality of wall screens associated with each individual wall of the video taking enclosure;

providing a plurality of video cameras, each of which views a different individual wall screen of the video taking enclosure;

wherein video may be taken by one or more of the cameras by combining the subject and a background image viewed by a given camera; and wherein the plurality of projectors do not directly illuminate the subject.

15. A video image producing method, comprising:

providing a video taking enclosure having a plurality of individual walls which accommodate a subject;

providing a plurality of projectors, each of which displays a sequence of images on one of a plurality of wall screens associated with each individual wall of the video taking enclosure;

providing a plurality of video cameras, each of which views a different individual wall screen of the video taking enclosure;

wherein video may be taken by one or more of the cameras by combining the subject and a background image viewed by a given camera; and selecting from at least one of the plurality of video cameras to take the video, wherein each of the plurality of cameras directly views the subject and one of a plurality of screens.

16. The video image producing method according to claim 15, wherein the selecting is performed automatically.

17. A video image producing method, comprising:

providing a video taking enclosure having a plurality of individual walls which accommodate a subject;

providing a plurality of projectors, each of which displays a sequence of images on one of a plurality of wall screens associated with each individual wall of the video taking enclosure;

providing a plurality of video cameras, each of which views a different individual wall screen of the video taking enclosure;

wherein video may be taken by one or more of the cameras by combining the subject and a background image viewed by a given camera; and displaying a plurality of movies on the plurality of screens, wherein each one of the plurality of movies is separately displayed on each screen of the plurality of screens, and further wherein the plurality of screens surround the subject.

18. A video image producing system, comprising:

a video taking enclosure having a plurality of stationary individual walls which accommodate a subject;

a plurality of projectors, each of which displays a sequence of background images on one of a plurality of stationary wall screens associated with each individual wall of the video taking enclosure; and a plurality of video cameras, each of which views a different individual wall screen of the video taking enclosure; and wherein video may be taken by one or more of the cameras of the subject and the sequence of background images by combining the subject and the sequence of background images viewed by a given camera.

* * * * *